United States Patent
Beadle et al.

(10) Patent No.: US 8,609,048 B1
(45) Date of Patent: Dec. 17, 2013

(54) PROCESS FOR REDUCING CORROSION, FOULING, SOLVENT DEGRADATION, OR ZEOLITE DEGRADATION IN A PROCESS UNIT

(71) Applicant: UOP LLC, Des Plaines, IL (US)

(72) Inventors: Bruce R. Beadle, Kildeer, IL (US); Jayant K. Gorawara, Buffalo Grove, IL (US); Vladislav I. Kanazirev, Arlington Heights, IL (US); Wugeng Liang, Elgin, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 13/667,151

(22) Filed: Nov. 2, 2012

(51) Int. Cl.
- *C01B 13/00* (2006.01)
- *C23F 11/00* (2006.01)
- *C23F 15/00* (2006.01)

(52) U.S. Cl.
USPC . 423/219; 252/389.53; 252/387; 252/400.53; 595/950; 422/7

(58) Field of Classification Search
USPC ............ 423/219; 252/389.53, 387, 400.53; 585/950; 422/7
See application file for complete search history.

(56) References Cited

U.S. PATENT DOCUMENTS

| | | | | | |
|---|---|---|---|---|---|
| 2,913,406 | A | * | 11/1959 | Hoover | 208/257 |
| 3,549,719 | A | * | 12/1970 | Duyverman et al. | 423/219 |
| 2011/0027156 | A1 | * | 2/2011 | Eisinger et al. | 423/219 |

FOREIGN PATENT DOCUMENTS

| | | | | |
|---|---|---|---|---|
| DE | 32 28 023 A1 | * | 2/1984 | C07C 7/12 |
| EP | 0 527 000 A2 | | 2/1993 | |
| EP | 0 792 679 A1 | | 9/1997 | |

OTHER PUBLICATIONS

Pangborn et al., "Safe and Convenient Procedure for Solvent Purification," Organometallics, 1996, 15, 1518-1520.
Tamaru, "Reactivity of chemisorbed oxygen on silver and copper surfaces . . . ," Surface Science 383 (1997), 261-267.
UOP GB-620 Adsorbent—Product Sheet, UOP, A Honeywell Company, 2010.
UOP GB-622 Adsorbent—Product Sheet, UOP, A Honeywell Company, 2011.

* cited by examiner

*Primary Examiner* — Timothy Vanoy
(74) *Attorney, Agent, or Firm* — Mark R Willis

(57) ABSTRACT

A process for process for reducing one or more of corrosion, fouling, solvent degradation, or zeolite degradation in a process unit is described. The process includes introducing the hydrocarbon feedstream containing oxygen to an adsorbent bed containing copper and reacting the oxygen with the copper to form copper oxide and a reduced oxygen feedstream, and introducing the reduced oxygen feedstream into the process unit. A process for reducing one or more of corrosion, fouling, solvent degradation, or zeolite degradation in an aromatics extraction unit is also described.

12 Claims, 1 Drawing Sheet

PROCESS FOR REDUCING CORROSION, FOULING, SOLVENT DEGRADATION, OR ZEOLITE DEGRADATION IN A PROCESS UNIT

FIELD OF THE INVENTION

This invention relates to processes for removing oxygen from hydrocarbon streams. More particularly, the invention relates to processes for reducing one or more of corrosion, fouling, solvent degradation, or zeolite degradation in a process unit by removing oxygen from hydrocarbon streams using an adsorbent bed.

BACKGROUND OF THE INVENTION

In some processes, small amounts of oxygen, either free oxygen or oxygenated hydrocarbons, in the feedstream to the process can cause problems in the process unit. Oxygen contamination can create one or more of corrosion problems by forming naphthenic acids, fouling by forming gums with olefinic material, solvent degradation in aromatic extraction units, and degradation of zeolitic adsorbents. Therefore, great care is taken to ensure that the feedstream does not contain oxygen, such as by nitrogen blanketing feed storage tanks, and minimizing potential air leaks into the system. However, hydrocarbon feeds that have been shipped or stored in unblanketed storage may contain oxygen which must be removed.

This oxygen contamination has traditionally been removed in an oxygen stripper. The feed is heated to about 180° C. to strip the free oxygen and to break down the unstable oxygenates, which requires a significant amount of energy and capital. In addition, there can be corrosion problems with the oxygen stripper overhead system due to the oxygen, water, and naphthenic acids, and fouling problems in the lower reboiler tubes due to the presence of the oxygenates and olefins.

There is a need for a method of removing oxygen from hydrocarbon process streams.

SUMMARY OF THE INVENTION

One aspect of the present invention is a process for reducing one or more of corrosion, fouling, solvent degradation, or zeolite degradation in a process unit. In one embodiment, the process includes introducing the hydrocarbon feedstream containing oxygen to an adsorbent bed containing copper and reacting the oxygen with the copper to form copper oxide and a reduced oxygen feedstream, and introducing the reduced oxygen feedstream to the process unit.

Another aspect of the invention is a process for reducing one or more of corrosion, fouling, solvent degradation, or zeolite degradation in an aromatics extraction unit. The process includes introducing an aromatic hydrocarbon feedstream containing oxygen to an adsorbent bed containing copper and reacting the oxygen with the copper to form copper oxide and a reduced oxygen feedstream, wherein the adsorbent bed is operated at a temperature of about 20° C. to about 150° C.; and introducing the reduced oxygen feedstream to the aromatics extraction unit.

DETAILED DESCRIPTION OF THE INVENTION

Figure 1:
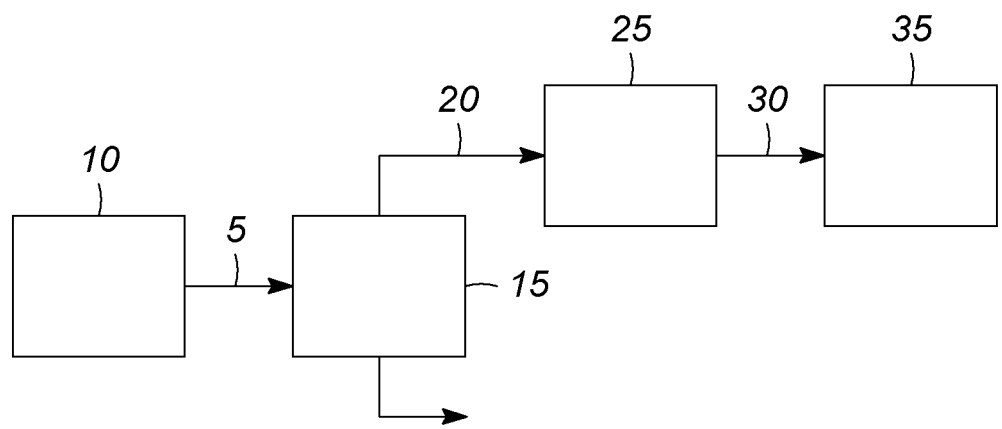
FIG. 1 is an illustration of one embodiment of the process of the present invention.

It has been discovered that oxygen can be removed from hydrocarbon feedstreams using an adsorbent bed at relatively low temperatures, reducing or eliminating the problems associated with the presence of oxygen. The oxygen in the feedstream can be in form of free oxygen, oxygenated hydrocarbons, or both. The system reduces energy consumption because it eliminates the need to heat the feedstream to 180° C. for the oxygen stripper. The capital costs for the adsorbent bed should be no more, and likely less, than an equivalent capacity oxygen stripper. In addition, the system can remove substantially all of the oxygen. In contrast, the degree of removal in an oxygen stripper depends on the severity of the operating conditions, and low boiling fractions are often lost in the overhead stream.

The hydrocarbon feedstream is introduced to an adsorbent bed containing copper. The copper reacts with the oxygen to form copper oxide and a feedstream having a reduced oxygen content compared to the incoming feedstream. The reduced oxygen feedstream can then be sent to the process unit. Process units include, but are not limited to, an aromatics complex containing aromatics extraction units, both liquid/liquid and extractive distillation, using mixed aqueous phase solvents or units which utilize zeolites for adsorptive separation, or the individual units in the complex. In some embodiments, the copper can be present in the form of metallic copper, copper compounds, or both. In some embodiments, the copper compounds can be pretreated to reduce some or all of the copper compound to metallic copper. Suitable copper compounds include, but are not limited to, copper (I) oxide, copper hydroxide, copper hydroxyl carbonate, malachite, copper salts, and combinations thereof.

In some embodiments, the copper can be on a support. In some embodiments, the support can react with the oxygenated hydrocarbons. Suitable supports include, but are not limited to, activated alumina, and hybrid alumina-molecular sieve products.

Suitable copper materials include, but are not limited to, GB620 and GB622 (available from UOP LLC) and PuriStar® R3-11 (available from BASF).

Although not wishing to be limited by theory, it is believed that the free oxygen reacts with the copper to form copper oxide, including copper (I) oxide and/or copper (II) oxide. It is also believed that the oxygenated hydrocarbons (when present) react with the support forming free oxygen, which then reacts with the copper to form copper oxide.

The adsorbent bed is typically operated at a temperature of at least about 20° C., or at least about 40° C., or at least about 60° C. It is typically operated at lower temperatures than oxygen strippers, e.g., less than about 150° C., or less than about 140° C., or less than about 120° C., or about 20° C. to about 150° C., or about 60° C. to about 100° C.

In some embodiments, the adsorbent bed is regenerated after use, while in others, the bed is replaced.

There can be one or more adsorbent beds. In some embodiments, a single bed can be used. The bed could be changed periodically, e.g., every few months or so. This process would either have to be stopped while the bed was replaced, or it could continue without the bed. This would be the least expensive arrangement. A process using a single bed could be acceptable depending on the length of time between bed changes, the process being run, and the level of oxygen in the incoming stream.

In other embodiments, two or more beds can be used in either a lead lag arrangement or a swing bed arrangement. In these arrangements, one bed is used while another (or more) bed is being replaced or regenerated.

In some embodiments, the adsorbent can be regenerated by passing a hydrogen containing gas stream, a carbon monoxide containing stream, or a light hydrocarbon containing stream through the adsorbent bed. The regenerating stream reduces some or all of the copper oxide formed back to metallic copper, a lower valence copper oxide, or combinations thereof.

With hydrogen containing streams and carbon monoxide containing streams, the regeneration takes place at a temperature in the range of about 100° C. to about 300° C., or about 150° C. to about 250° C. With the light hydrocarbon containing stream, the temperature is typically in the range of about 150° C. to about 350° C., or about 200° C. to about 300° C. Low purity hydrogen containing streams, e.g., hydrogen containing streams with greater than about 70% hydrogen, can be used, if desired. Such low purity hydrogen containing streams are readily available in aromatic complexes, for example.

In some embodiments, the oxygen-containing feedstream could be sent to a sulfur guard bed to remove sulfur before being introduced into the adsorbent bed. Sulfur guard beds are known in the art.

The adsorbent bed can be used in an aromatics complex, as shown in FIG. 1, for example. The reformate stream 5 from a catalytic reforming unit 10 is typically sent to a reformate splitter 15. The splitter overhead stream 20 containing the benzene fraction is sent to the adsorbent bed 25 where the free oxygen, oxygenated hydrocarbons, or both are removed. The effluent 30 from the adsorbent bed 25 is then sent to a solvent extraction/extractive distillation unit 35 for aromatics extraction.

The installation of the adsorbent bed in the splitter overhead stream is an economical option to remove the oxygen because the splitter overhead stream is much smaller than in the incoming stream to the reformate splitter.

Figure 2:
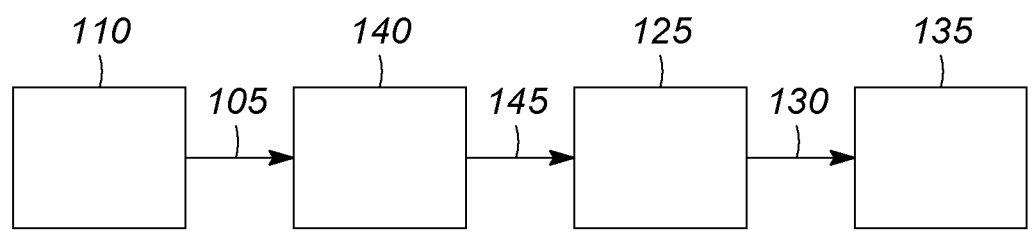
FIG. 2 is an illustration of another embodiment of the process of the present invention.

The splitter overhead stream is essentially free of sulfur compounds that could interfere with and reduce the life of the copper adsorbent. However, with other process units, a sulfur guard bed may be needed before the adsorbent bed, as shown in FIG. 2. The effluent 105 from the shipping vessel, pipeline facilities, storage facilities, and the like 110 is sent to a sulfur guard bed 140. The effluent 145 from the sulfur guard bed 145 is sent to the adsorbent bed 125. The effluent 130 from the adsorbent bed 125 is sent to process unit 135 for further processing.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A process for reducing one or more of corrosion, fouling, solvent degradation, or zeolite degradation in a process unit comprising:
   introducing an aromatic hydrocarbon feedstream containing oxygen to an adsorbent bed containing copper on a support and reacting the oxygen with the copper to form copper oxide and a reduced oxygen feedstream;
   introducing the reduced oxygen feedstream to the process unit,
   wherein the support reacts with the oxygenated hydrocarbons, and
   wherein the support is activated alumina, hybrid alumina-molecular sieve products, or combinations thereof.

2. The process of claim 1 wherein the copper is metallic copper, a copper compound, or combinations thereof.

3. The process of claim 2 wherein the copper compound is pretreated before use to reduce at least a portion of the copper compound to metallic copper.

4. The process of claim 2 wherein the copper compound is copper (I) oxide, copper hydroxide, copper hydroxy carbonate, malachite, a copper salt, or combinations thereof.

5. The process of claim 1 wherein the adsorbent bed is operated at a temperature of about 20° C. to about 150° C.

6. The process of claim 1 further comprising regenerating the adsorbent bed after a period of use to reduce the copper oxide to metallic copper, a lower valence copper oxide, or combinations thereof.

7. The process of claim 6 wherein regenerating the adsorbent bed comprises passing a hydrogen containing stream or a carbon monoxide containing stream through the adsorbent bed at a temperature in a range of about 100° C. to about 300° C.

8. The process of claim 6 wherein regenerating the adsorbent bed comprises passing a light hydrocarbon containing stream through the adsorbent bed at a temperature in a range of about 150° C. to about 350° C.

9. The process of claim 1 further comprising replacing the adsorbent bed after a period of use.

10. The process of claim 1 wherein there are two or more adsorbent beds.

11. The process of claim 1 further comprising introducing the hydrocarbon feedstream into a sulfur guard bed to remove sulfur compounds from the hydrocarbon feedstream before introducing the hydrocarbon feedstream to the adsorbent bed.

12. The process of claim 1 wherein the process unit is selected from an aromatics complex, an aromatics extraction unit, a liquid-liquid extraction unit, an extractive distillation unit, an adsorptive separation unit containing a zeolite, or combinations thereof.

\* \* \* \* \*